(12) United States Patent
Noé

(10) Patent No.: US 7,162,154 B2
(45) Date of Patent: Jan. 9, 2007

(54) SYSTEM AND METHOD FOR DISPERSION DETECTION

(75) Inventor: Reinhold Noé, Helmerner Weg 2, 33100 Paderborn (DE)

(73) Assignee: Reinhold Noe, Paderbor (DE)

( * ) Notice: Subject to any disclaimer, the term of this patent is extended or adjusted under 35 U.S.C. 154(b) by 658 days.

(21) Appl. No.: 10/414,661

(22) Filed: Apr. 14, 2003

(65) Prior Publication Data

US 2004/0017573 A1 Jan. 29, 2004

(30) Foreign Application Priority Data

Apr. 12, 2002 (DE) ............................ 102 16 281

(51) Int. Cl.
*H04B 10/08* (2006.01)
*H04B 17/00* (2006.01)
*H04B 10/00* (2006.01)

(52) U.S. Cl. ........................................ 398/29; 398/159

(58) Field of Classification Search ................... 398/29, 398/154, 159
See application file for complete search history.

(56) References Cited

U.S. PATENT DOCUMENTS

| 5,969,806 | A | 10/1999 | Bergano |
| 6,204,949 | B1 * | 3/2001 | Ishikawa et al. ............ 398/159 |
| 6,252,692 | B1 | 6/2001 | Roberts |
| 6,594,003 | B1 * | 7/2003 | Horiuchi et al. ........... 356/73.1 |

FOREIGN PATENT DOCUMENTS

DE 36 38 583 6/1987

* cited by examiner

*Primary Examiner*—Shi K. Li

(57) ABSTRACT

According to the system and method of the present invention, the frequency of an optical data signal is modulated on the transmitter side, and group transit time changes of the optical signal are detected on the receiver side. These group transit time changes are preferably determined via synchronous demodulation of a control signal of a voltage-controlled oscillator for timing recovery and are a measurement for any chromatic dispersion, which can be compensated via a chromatic dispersion compensator. The parasitic amplitude modulation generated with the frequency modulation can be used to obtain a reference signal for the synchronous demodulation.

10 Claims, 4 Drawing Sheets

SYSTEM AND METHOD FOR DISPERSION DETECTION

BACKGROUND OF THE INVENTION

Chromatic dispersion causes interference in high-speed optical data transmission and must be compensated. However, it is first necessary to detect the chromatic dispersion.

In the conference proceedings of the European Conference on Optical Communication, held in Amsterdam, NL, from Sept. 30 to Oct. 4, 2001, Tu.A.3.4, pp. 210–211, a method for measuring polarization mode dispersion was presented. This method is based on an arrival time detection of a detected electrical signal obtained from a polarization-modulated optical signal. To this end, at least one signal parameter of the transmitted light, being a linear combination of one or more Stokes parameters describing the polarization, is or are modulated. The arrival time of the optical signal is a linear function of a specific linear combination such as this.

An object of the present invention is to present a further system and corresponding method for dispersion detection.

SUMMARY OF THE INVENTION

The present invention is advantageous in that chromatic dispersion is detected, wherein significant interference effects in high-speed optical data transmission can be quantified and, thus, eliminated by applying further stages of the method.

Specifically, in an embodiment of the present invention, a system (and associated method) is provided for dispersion detection, wherein the system includes an optical transmitter for sending an optical signal modulated relative to a signal parameter, and a receiver which includes a measuring module for measuring group transit time changes of the optical signal which are proportional to the signal parameter, wherein the optical transmitter sends optical signal transmitting data having an optical frequency which is modulated by a frequency modulation signal routed to the optical transmitter to generate proportional group transit time changes of the optical signal in a presence of chromatic dispersion, with the signal parameter being the optical frequency, and the measuring module determines the group transit time changes by comparing the transmitted data with a group transit time reference to measure chromatic dispersion.

In an embodiment, the receiver further includes a digital receiver which emits a phase comparison signal, and the measuring module includes an oscillator, which emits a clock pulse and is the group transit time reference, and a clock pulse regulator which is controlled by the phase comparison signal and regulates the oscillator and a frequency of the clock pulse in a phase control loop.

In an embodiment, the measuring module further includes a signal processing unit for synchronous demodulation of the group transit time changes of the optical signal which are proportional to the frequency modulation.

In an embodiment, the optical transmitter further includes at least one amplitude modulation part, which impresses on the optical signal an amplitude modulation, having a temporal relationship with the frequency modulation, and the signal processing unit includes a filter unit for synchronous demodulation which derives at least one reference signal from the amplitude modulation which is contained in a detected signal of the receiver obtained from the optical signal.

In an embodiment, the amplitude modulation part includes a laser which impresses the frequency modulation and amplitude modulation on the optical signal.

In an embodiment, the optical transmitter further includes a reference impression part for impressing a temporal reference, with which the frequency modulation has a temporal relationship, on the optical signal via a transmitter-side data modulation signal, and the signal processing unit includes a reference signal extraction unit for synchronous demodulation, deriving at least one reference signal from the temporal reference contained in a data signal of a receiver corresponding to the transmitter-side data modulation signal.

In an embodiment, the reference impression part impresses the temporal reference as a frame clock of the transmitter-side data modulation signal.

Additional features and advantages of the present invention are described in, and will be apparent from, the following Detailed Description of the Invention and the Figures.

DETAILED DESCRIPTION OF THE INVENTION

A solution according to the present invention involves selecting the optical frequency as a signal parameter. The frequency-modulated optical signal is received by an optical receiver designed for arrival time detection, with arrival time modulation parts proportional to frequency modulation being detected. Chromatic dispersion is thus detected.

According to the present invention, a transmitter laser, which is tracked by an external modulator for data modulation, is preferably modulated relative to its optical frequency. This is most easily achieved by sinusoidal modulation of the transmitter laser's pump flow. On the receiver side, the control signal of the voltage-controlled oscillator providing the recovered bit timing is evaluated. The fluctuations of this signal or integral thereof, which are proportional to the impressed frequency modulation, are a measurement for existing chromatic dispersion.

Figure 1:
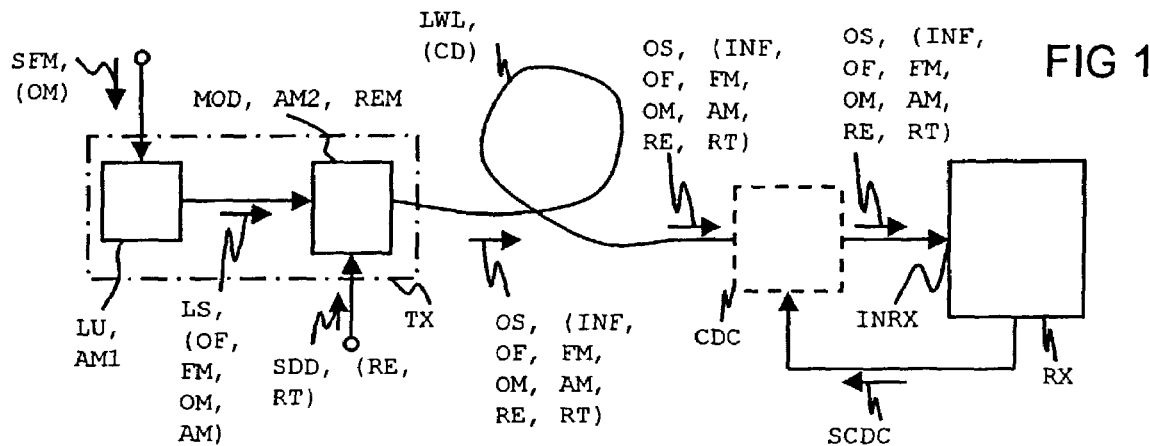
FIG. 1 shows a system for dispersion detection.

In a system for dispersion detection according to FIG. 1, an optical signal OS is generated in an optical transmitter TX using data INF which has been impressed, for example, via intensity modulation. The system is used for the detection of chromatic dispersion CD. To this end, a frequency modulation FM is also applied, which modulates the optical frequency OF as a signal parameter SP of the optical signal OS. Therefore, within the optical transmitter TX, it is possible to admit, for example, a laser LU having a frequency modulation signal SFM of modulation frequency OM, which modulates for example the pump flow of the laser LU. In the case of multi-electrode lasers, there are one or more tuning flows instead of or in addition to the pump flow. The laser signal LS emitted by the laser LU contains a frequency modulation FM corresponding to the frequency modulation signal SFM. It is then modulated via a transmitter-side data modulation signal SDD in a modulator MOD, which may, for example, be a Mach-Zehnder modulator or electroabsorption modulator, such that the data INF corresponds to the transmitter-side data modulation signal SDD. The modulator MOD may generate intensity modulation or a phase modulation, such as for binary or quadrature, or if applicable differential, phase-shift keying. It also may, or additionally, generate polarization modulation or impress variable data modulations on variable polarizations. In these alternative cases as well, data INF is impressed on the optical signal OS. For the sake of clarity, any optical and/or electrical amplifiers required are not shown here or in the following Figures.

After passing through an optical waveguide LWL, which may have chromatic dispersion CD, the optical signal OS may pass through a chromatic dispersion compensator CDC. This includes, for example, a chirped fiber Bragg grating, which may be expanded or heated to adjust the chromatic dispersion CD, or a chain of Mach-Zehnder interferometers. The optical signal OS is finally routed to a receiver input INRX of a receiver RX. The receiver RX is at least able to emit a control signal SCDC to control the chromatic dispersion compensator CDC.

Figure 2:
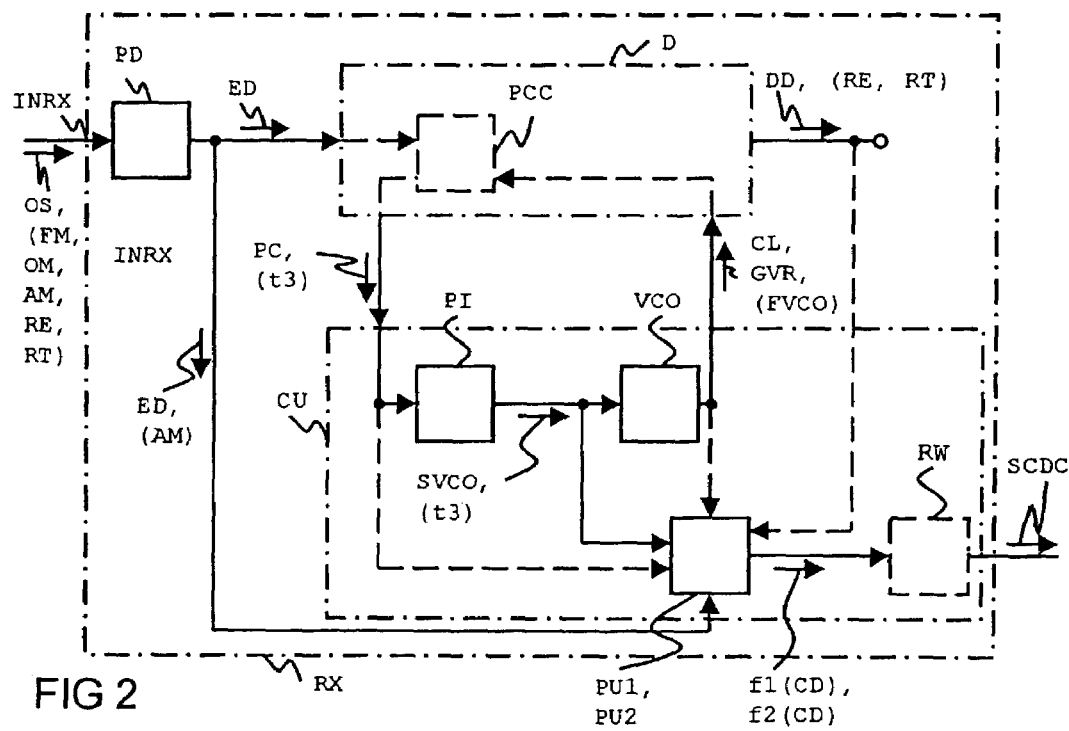
FIG. 2 shows a receiver in the system.

According to FIG. 2, the receiver RX, which is designed here as an optical receiver for intensity-modulated signals, contains a photodetector PD, which detects the optical signal OS and emits a detected signal ED. This detected signal is an electrical signal. Receivers RX designed differently, such as receivers for phase modulation, each emit a detected signal ED. In this case, the photodetector PD may contain a single photodiode, or, if applicable, several photodiodes, or it may contain an optical overlay receiver. The detected signal ED is routed to a digital receiver D. The digital receiver D, which regenerates the detected signals ED, emits a received data signal DD, which preferably includes an electrical signal. By appropriately adjusting the chromatic dispersion compensator CDC, if there is one, the received data signal DD corresponds to the transmitter-side modulation signal SDD (disregarding the time delay), which for the sake of simplicity no longer will be taken into consideration in the following. This is a typical situation during operation: any bit errors in the received data signal DD cause, at most, insignificant interference with the function of the present invention. The data INF is transmitted by the photodetector PD from the optical signal OS to the detected signal ED.

The digital receiver D also emits a phase comparison signal PC, which shows whether the edges of the clock pulse CL, in relation to data INF, have been routed to the digital receiver D (on average) too soon, on time or too late. The phase comparison signal PC is customarily designed such that its polarity and amplitude show the direction and size of the time error; the zero value therefore corresponds, in relation to data INF, to the perfect timing of the edges of clock pulse CL. The clock pulse CL is thus a group transit time reference GVR in receiver RX.

The receiver RX has a measuring module CU. A clock pulse CL, which controls the regeneration process, is emitted from a voltage-controlled oscillator VCO to the digital receiver D.

A clock pulse regulator PI, which is typically designed as a proportional-integral regulator, is triggered by the first phase comparison signal PC and controls the frequency FVCO of the voltage-controlled oscillator VCO via a frequency control signal SVCO. The device within the digital receiver D to obtain the phase comparison signal PC, the clock pulse regulator PI and the voltage-controlled oscillator VCO, together form a phase control circuit.

Exemplary embodiments for a digital receiver D including phase comparator PCC to obtain the phase comparison signal PC are known, for example, from German printed patent specification DE 44 43 417. According to this patent specification, the output signal of the actual discriminator preferably is correlated with the output signals of two further discriminators, each pulsed half a bit duration ahead and/or behind the actual discriminator, and the difference of the two correlates is used as the phase comparison signal PC.

Figure 3:
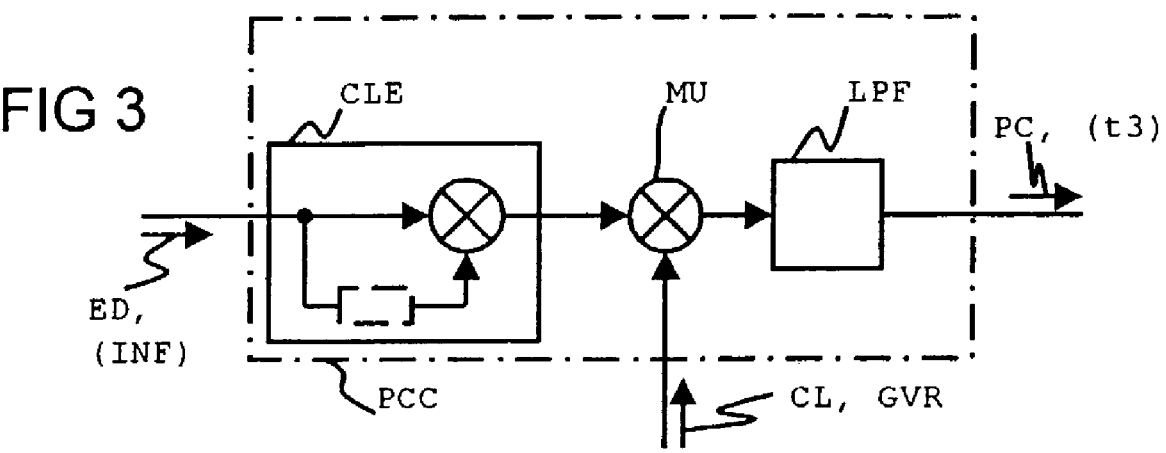
FIG. 3 shows a phase comparator.

Alternatively, in the simplest case, a phase comparator PCC according to FIG. 3 is provided with a clock line extractor CLE within the digital receiver D. The clock line extractor CLE multiplies the detected signal ED by itself, with it being possible, but not obligatory, to delay one of the signals processed in the clock line extractor CLE, for example, half a bit duration compared to the other. It emits a signal to an input of a multiplier MU, which is dependent on the data INF. A further input of the multiplier MU is triggered by the clock pulse CL. A lowpass filter LPF is provided at the output of the multiplier MU. The output signal thereof is the phase comparison signal PC.

Figure 4:
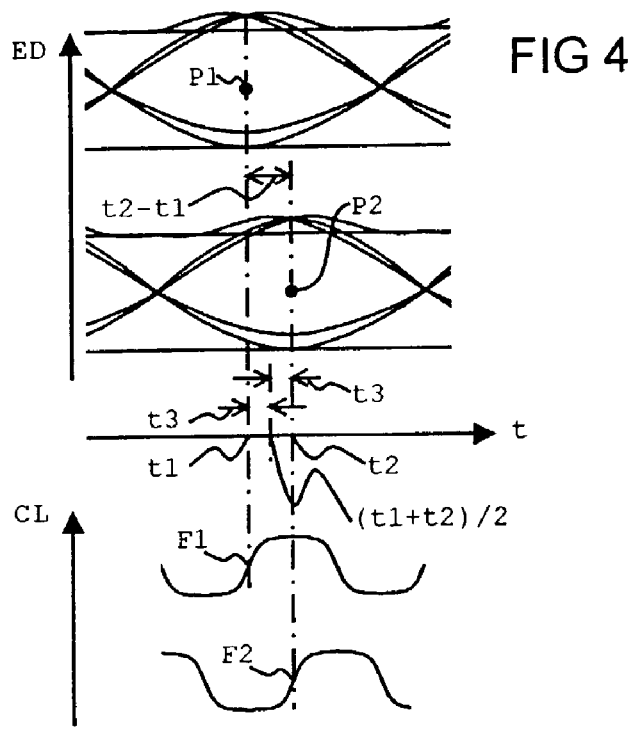
FIG. 4 shows eye patterns.

FIG. 4 shows eye patterns of the detected signal ED above the horizontal axis indicating the arrival time t. The distortions drawn correspond approximately to those occurring if there is chromatic dispersion CD. The triggering corresponds to the clock of the transmitter-side modulation signal SDD. At the extreme values of the frequency modulation FM, eye patterns displaced in time against each other are produced, the first and second optimum scanning points P1, P2 of which are located at different first and/or second arrival time points t1, t2. The difference t2–t1 of these extreme first and second arrival time points t1, t2, in the case of the representation of eye patterns of detected signal ED, is equal, for approximation purposes at least, to the product of chromatic dispersion CD, expressed in transit time change per frequency change, and peak height of the frequency modulation FM, expressed as a frequency. The same applies for the group transit time changes t3 compared to the average arrival time point (t1+t2)/2. Two of many possible group transit time changes t3 are shown in FIG. 4, being those which occur if the first and/or second arrival time point t1, t2 are available.

By way of example, FIG. 4 shows oscillograms of the clock pulse CL belonging to the first and second arrival time points t1, t2 below the horizontal axis indicating the arrival time t. If the modulation frequency OM is lower than the bandwidth of the phase control loop, the first and/or second edges F1, F2 of the clock pulse CL coincide, as shown, with the first and/or second arrival time points t1, t2. The first and second edges F1, F2 are shown here as rising; however, they could fall or, in a digital receiver D configured according to German patent application P 44 43 417.0, the edges of a clock pulse CL only having half the bit timing frequency could alternately rise and fall. According to the present invention, the group transit time changes t3 are evaluated and used as a measurement for any chromatic dispersion CD. The arrival time t, which oscillates to and fro over the course of time, for example, between the different first and second arrival time points t1, t2, is, for approximation purposes at least, proportional to the integral of the frequency control signal SVCO. The frequency control signal SVCO is thus routed to a first or second signal processing unit PU1, PU2, which evaluates the integral or temporal fluctuations of the integral of the frequency control signal SVCO routed thereto. In certain cases, such as with sinusoidal frequency modulation FM with a single modulation frequency OM configured as a constant, the frequency control signal SVCO also can be evaluated instead of the integral, as the integration of a sine-wave signal again produces a sinusoidal signal.

In practice, the first and second edges F1, F2 of the clock pulse CL only follow the first and second arrival time points t1, t2 after a certain delay caused by the phase control loop. In cases in which the modulation frequency OM exceeds the bandwidth of the phase control loop, the first and second edges F1, F2 of the clock pulse CL will not coincide with the first and/or arrival time points t1, t2, but with the average arrival time point (t1+t2)/2 at least at very high modulation frequency OM. This is not, however, impeding, as the phase comparison signal PC is in this case proportional to group transit time changes t3, and the group transit time changes t3 required to detect chromatic dispersion are usually very small and, therefore, do not necessarily have to be succeeded by timing recovery, they only have to be detected. High modulation frequencies OM are advantageous compared to lower modulation frequencies OM, in that interference in the detection of chromatic dispersion CD due to the phase noise of oscillator VCO is slight, thus ensuring greater sensitivity.

Because of the delay in the phase control loop, the first or second signal processing unit PU1, PU2 can process the corresponding phase comparison signal PC instead of the frequency control signals SVCO or preferably in addition thereto. It is also possible to process the clock pulse CL in the first or second signal processing unit PU1, PU2.

First and second signal processing units PU1, PU2 emit on the output side a first and/or second measurement signal f1(CD) and/or f2(CD) respectively, each of which is a function of chromatic dispersion CD. The first and/or second measurement signal f1(CD), f2(CD) may be routed to a chromatic dispersion controller RW, which derives the control signal SCDC therefrom.

The modulation frequency OM is preferably selected, such that it is very low compared to the bit timing frequency of the optical signals OS, yet at the same time high compared to the line width of the voltage-controlled oscillator VCO occurring without a phase control loop. In such a design, the first and/or second measurement signal f1(CD), f2(CD) has a particularly high signal-to-noise ratio; suitable values of modulation frequency OM lie, for example, between 100 kHz and 30 MHz. If the modulation frequency OM does not lie within the bandwidth of the phase control loop, this does not usually cause interference, as already mentioned, because the height of the frequency modulation (FM) usually can be selected to be at such a low level that the occurring group transit time changes t3 do not impede the data signal regeneration, even if the clock pulse CL is not duly tracked.

Even higher modulation frequencies OM, largely any in the useful frequency band of data INF, are permissible. However, they increase the cost of achieving the present invention.

Figure 5:
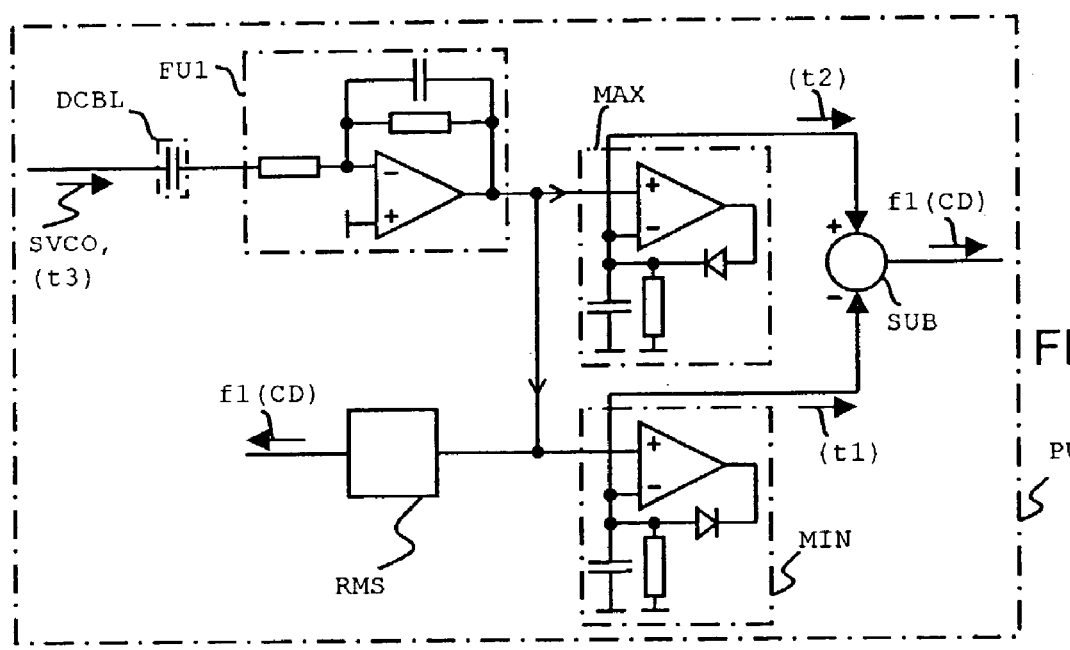
FIG. 5 shows a signal processing unit.

FIG. 5 shows in more detail the first signal processing unit PU1 configured as asynchronous. The frequency control signal SVCO routed thereto is routed to a first filter unit FU1 if applicable after passing through an equisignal blocker DCBL. The first filter unit FU1 may be designed as a lowpass filter with a cutoff frequency selected preferably lower than the modulation frequency OM and is, therefore, able to operate as an integrator, for approximation purposes at least, in the frequency range of the modulation frequency OM. The output signal of the first filter unit FU1 is routed to a maximum hold device MAX and a minimum hold device MIN. The output signals thereof are, for approximation purposes at least, linear functions of the extreme first and second arrival time points t1, t2. The output signals of the maximum hold device MAX and minimum hold device MIN are subtracted in a first subtractor SUB.

At the output of the subtractor SUB, the first measurement signal f1(CD) is produced, which, for approximation purposes at least, is proportional to the amount of chromatic dispersion CD. In an alternative exemplary embodiment, the output signal of the filter FIL is routed to a root-mean-square value meter RMS, the output signal of which is the first measurement signal f1(CD).

The hold time constants of the maximum hold device MAX and minimum hold device MIN and/or the root-mean-square value meter RMS preferably are selected such that they are in the same order of magnitude or slightly larger than the period length belonging to the modulation frequency OM.

Particularly with sinusoidal frequency modulation FM of the modulation frequency OM, the first filter unit FU1 preferably is designed as a bandpass filter with a mid-frequency equal to the modulation frequency OM, because integration in such cases is superfluous and such a band limitation increases the measuring accuracy.

Figure 6:
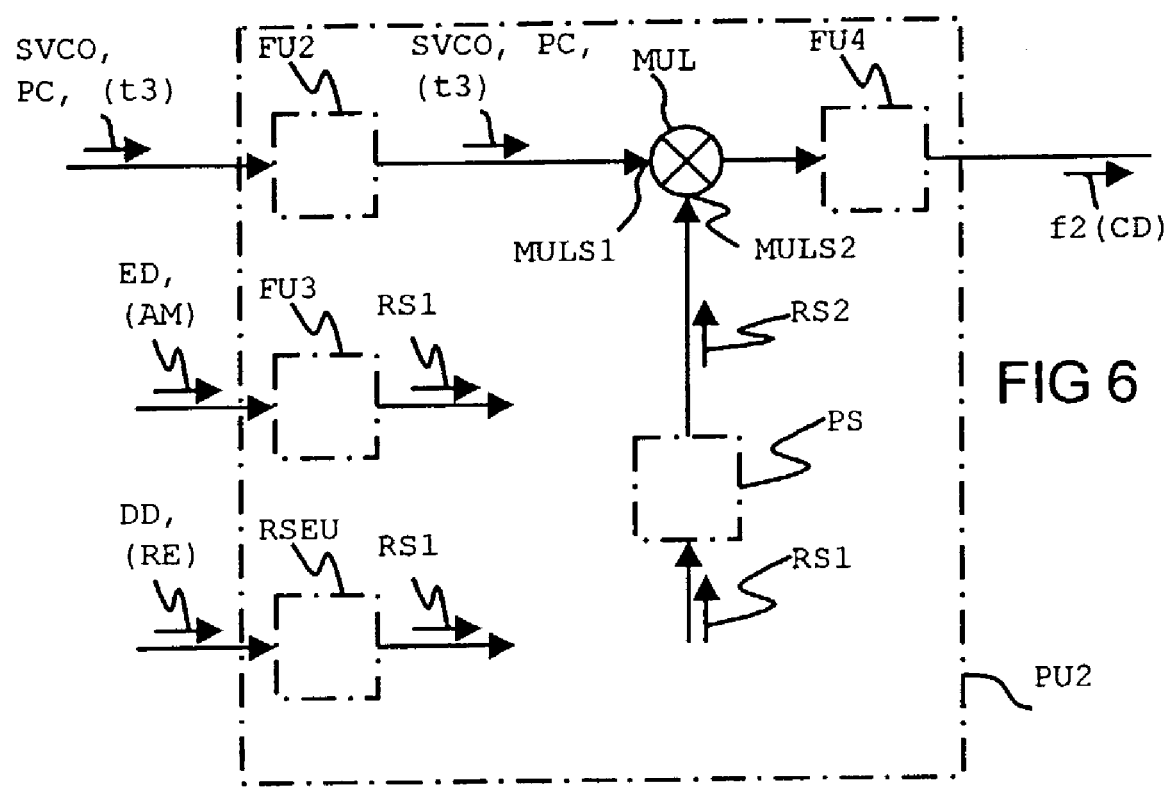
FIG. 6 shows a further signal processing unit.

FIG. 6 shows the second signal processing unit PU2 configured as synchronous. Instead of the asynchronous evaluation of group transit time changes t3 as used in the above exemplary embodiments, these changes are detected or demodulated in this case synchronously. A considerable advantage of synchronous demodulation is that the detection sensitivity can be increased to almost any level simply by increasing the averaging time. The recurring group transit time changes t3 easily can, therefore, be detected, even if they lie in the low femto second range or even in the atto second range, provided the measuring time is long enough; e.g., 1 ms to 10 s. As such, a comparably low frequency modulation FM over for example a few 100 MHz is already sufficient to detect the chromatic dispersion CD of a 10 or 40 Gbit/s or even higher speed signal with satisfactory sensitivity. Such a low frequency modulation FM is totally permissible in the operation of optical data transmission systems with wavelength multiplex, as the optical frequency spacing is usually a multiple of the bit sequence frequency. At the same time, the frequency modulation FM and the amplitude modulation AM mentioned below also can be used for purposes other than for the detection of chromatic dispersion; for example, to monitor the average value of the optical frequency OF using an optical frequency discriminator or to suppress stimulated Brillouin scattering.

At least one reference signal RS1, RS2 is then routed to a second synchronous demodulator input MULS2 of a synchronous demodulator MULS. The second reference signal RS2 is therefore equal to the first reference signal RS1, provided there is no phase modifier PS. However, if there is a phase modifier PS, the second reference signal RS2 is generated from the first reference signal RS1.

The frequency modulation FM preferably is sinusoidal, but, for example, a rectangular form is also possible. The routed frequency control signal SVCO or phase comparison signal PC or a linear combination of the two is and/or are proportional to the group transit time changes t3. Due to the delays occurring in the phase control loop, the proportionality factor is highly dependent on frequency and entails possible phase delays. The routed frequency control signal SVCO or phase comparison signal PC is routed to a first synchronous demodulator input MULS1 of the synchronous demodulator MULS, if applicable after passing through a second filter unit FU2, which is designed, for example, as a bandpass filter for the modulation frequency FM. The second synchronous demodulator input MULS2 of the synchronous demodulator MULS receives the second reference signal RS2, which is, for example, a sine-wave signal of the modulation frequency OM, which is phase-synchronous to that spectral component of the modulation frequency OM in which the frequency control signal SVCO or phase comparison signal PC is routed to the first synchronous demodulator input MULS1, corresponding to chromatic dispersion CD. For example, if the arrival time in the case of a very high bandwidth of the phase control loop is a linear function of the instantaneous value of frequency modulation FM, the frequency control signal SVCO is proportional to the temporal derivative thereof. Thus, in the case of sinusoidal frequency modulation FM it is leading by 90°. In this case, the second reference signal RS2 is a sine-wave signal of modulation frequency FM, which leads or trails the frequency modulation FM in the receiver RX by 90°. However, in particular with amplitude modulation AM, the frequency control signal SVCO or phase comparison signal PC also may, due to the non-ideal behavior of the phase comparator PCC, contain a spectral component of modulation frequency OM which is not dependent on there being chromatic dispersion CD. In this case, if applicable, it may be advantageous if a signal is chosen as the second reference signal RS2 which is orthogonal thereto; i.e., phase-displaced by ±90°. The second reference signal RS2 may be identical to the first reference signal RS1, or may be generated therefrom via phase displacement in the phase modifier PS. The first reference signal RS1 preferably is a sine-wave signal of the modulation frequency OM.

In a possible exemplary embodiment, the first reference signal RS1 is generated from the detected signal ED, which contains an amplitude modulation AM synchronous to the frequency modulation FM. To this end, the detected signal ED is routed to a third filter unit FU3, which is designed, for example, as a bandpass filter or a phase control loop for modulation frequency OM. Amplitude modulation AM in the order of 1% of the average signal level is totally satisfactory for this. Significantly larger amplitude modulations AM, such as those greater than 10%, deteriorate the sensitivity of the receiver RX with respect to the modulation also present through the transmitter-side data modulation signal SDD.

The amplitude modulation AM is generated in a first or second amplitude modulation part AM1, AM2. The laser LU, the pump flow of which preferably is modulated by the frequency control signal SFM, is used as the first amplitude modulation part AM1. Due to inherent laser properties, not only is the optical frequency OF modulated, but so too is the light power of the optical signal OS; i.e., its amplitude. Although this simple pump-flow modulation is often satisfactory, multi-electrode lasers offer further degrees of liberty. Multi-electrode lasers produce the electrical signals routed to the various electrodes with generally variable frequency modulation FM and amplitude modulation AM. If the frequency control signal SFM is routed to more than one electrode in the multi-electrode laser at variable amplitudes and polarities, if applicable, it is generally possible to set the desired frequency modulation FM and amplitude modulation AM at their applicable strengths independently of each other.

Alternatively, the second amplitude modulation part AM2 can be used, which is the modulator MOD. A signal with low amplitude proportional to the frequency control signal SFM is routed to this modulator for the purposes of amplitude modulation AM.

Particularly in cases in which there is no amplitude modulation AM, it is favorable to set up the frequency modulation FM synchronously to a temporal reference RE, which is transmitted together with the optical signal OS; for example, synchronously to a frame clock pulse RT of a bit error correction algorithm of the transmitter-side data modulation signal SDD. This is achieved by a reference impression part REM; for example, the modulator MOD. The received data signal DD contains the same temporal reference RE because the frame clock pulse RT can be recovered from the received data signal DD. In such cases, the received data signal DD is routed to a reference signal extraction unit RSEU, at the output of which the first reference signal RS1 is available.

The second measuring signal f2(CD) is available at an output of the synchronous demodulator MULS, if applicable, after passing through a fourth filter unit FU4, preferably designed as a lowpass filter, the second measuring signal f2(CD) ideally being proportional to the chromatic dispersion CD. As the chromatic dispersion CD is even shown with the right sign, the compensation of chromatic dispersion CD is particularly simple. For example, a simple integrator is suitable as a chromatic dispersion controller RW, which is connected to the second signal processing unit PU2, at least if the chromatic dispersion added by the chromatic dispersion compensator CDC is a monotone function of the control signal SCDC.

The synchronous demodulator MULS can be designed as a multiplier of time signals.

However, the functions of the signal processing units PU1, PU2 according to FIGS. 5 and 6 also can be achieved via digital signal processing, which is described in more detail below. For example, second and third filter units FU2, FU3 can be implemented by calculating Fourier coefficients. In doing so, it is favorable to always select a constant amount of the first reference signal RS1, so that deviations in the average power of the optical OS do not affect the functioning of the synchronous demodulator MULS in a first approximation. The phase modifier PS multiplies the first reference signal RS1 represented by a Fourier coefficient by a complex number, thus producing the second reference signal RS2. The synchronous demodulator MULS is now implemented by multiplying the frequency control signal SVCO or phase comparison signal PC, which is adjacent to the first synchronous demodulator input MULS1 and is also represented by a Fourier coefficient, by the complexly conjugated second reference signal RS2 adjacent to the second synchronous demodulator input MULS2 and providing the real component of this product as a second measuring signal f2(CD) at the output of the synchronous demodulator MULS.

The present invention is also suitable, for example, for cases in which more than one polarization is transmitted via polarization multiplex or polarization shift keying. With polarization multiplexing, it may be favorable to generate a differential phase modulation between the two transmitted signals using polarizations which are orthogonal to each other. This can be achieved by frequency-modulating the transmitter laser using a frequency modulation FM, splitting the signal of the transmitter laser on two transmitter-side signal branches of differing lengths into two transmitter-side subsignals, modulating the transmitter-side subsignals independently of each other with a respective data flow and then bringing them together again using orthogonal polarizations. The frequency modulation FM generates the differential phase modulation in conjunction with the varying lengths of both transmitter-side signal branches. The frequency modulation FM also can be used according to the present invention for the detection of chromatic dispersion CD. With polarization multiplexing, both transmitted subsignals corresponding to the transmitter-side subsignals are split into receiver-side subsignals on the receiver side using polarizations orthogonal to each other on two receiver-side signal branches. This is achieved via a polarization beam splitter or a coupler, with a polarizer being accommodated in each of its output arms, and with both these polarizers being aligned orthogonally to each other for approximation purposes at least. The receiver-side subsignals are then received in a respective optical receiver. The amplitude modulation AM generated together with the frequency modulation FM is best detected by adding the parts of amplitude modulation AM received in both optical receivers, so that the average amplitude modulation AM available before splitting the polarizations can be detected. It is similarly possible, before the transmitted subsignals are split into receiver-side subsignals, to detect the amplitude modulation AM of both transmitted subsignals together in an auxiliary receiver, to which a preferably smaller part of power of both transmitted subsignals is routed.

With respect to the proportional group transit time changes t3 of the optical signal OS which are caused by the frequency modulation FM, it is preferable to detect the sum of the group transit time change parts occurring in both optical receivers and corresponding to both receiver-side subsignals.

Although the present invention has been described with reference to specific embodiments, those of skill in the art will recognize that changes may be made thereto without departing from the spirit and scope of the present invention as set forth in the hereafter appended claims.

The invention claimed is:

1. A system for dispersion detection, comprising:
an optical transmitter for transmitting an optical signal modulated relative to a signal parameter; and
a receiver for receiving the optical signal, the receiver including a measuring module for measuring group transit time changes of the optical signal which are proportional to the signal parameter;
wherein the optical transmitter transmits optical signal transmitting data having an optical frequency which is modulated by a frequency modulation signal routed to the optical transmitter to generate proportional group transit time changes of the optical signal in a presence of chromatic dispersion, the signal parameter being the optical frequency, and the measuring module determining the group transit time changes by comparing the transmitted data with a group transit time reference to measure the chromatic dispersion, and the measuring module includes a signal processing unit for synchronous demodulation of the group transit time changes of the optical signal which are proportional to the frequency modulation; and
wherein the optical transmitter also includes at least one amplitude modulation part, which impresses an amplitude modulation on the optical signal, having a temporal relationship with the frequency modulation, and the signal processing unit includes a filter unit for synchronous demodulation which derives at least one reference signal from the amplitude modulation contained in a detected signal of the receiver obtained from the optical signal.

2. A system for dispersion detection as claimed in claim 1, wherein the receiver further includes a digital receiver which emits a phase comparison signal, and the measuring module includes an oscillator, which emits a clock pulse and is the group transit time reference, and a clock pulse regulator which is controlled by the phase comparison signal and regulates the oscillator and a frequency of the clock pulse in a phase control loop.

3. A system for dispersion detection as claimed in claim 1, wherein a first amplitude modulation part includes a laser which impresses the frequency modulation and the amplitude modulation on the optical signal.

4. A system for dispersion detection as claimed in claim 1, wherein the optical transmitter further includes a reference impression part for impressing a temporal reference, with which the frequency modulation has a temporal relationship, on the optical signal via a transmitter-side data modulation signal, and the signal processing unit includes a reference signal extraction unit for synchronous demodulation, deriving at least one reference signal from the temporal reference contained in the data signal of the receiver corresponding to the transmitter-side data modulation signal.

5. A system for dispersion detection as claimed in claim 4, wherein the reference impression part impresses the temporal reference as a frame clock of the transmitter-side data modulation signal.

6. A method for dispersion detection, the method comprising the steps of:
transmitting an optical signal, modulated relative to a signal parameter, from an optical transmitter, wherein the optical signal transmits data, with an optical frequency of the optical signal being modulated by a frequency modulation signal to generate proportional group transit time changes of the optical signal in a presence of chromatic dispersion, such that the signal parameter is formed via the optical frequency;
measuring the group transit time changes of the optical signal which are proportional to the signal parameter on a receiver side in a measuring module, wherein the group transit time changes are determined by comparing the transmitted data with a group transit time reference to measure the chromatic dispersion;
synchronously demodulating the group transit time changes of the optical signal which are proportional to the frequency modulation on the receiver side;
impressing an amplitude modulation, having a temporal relationship with the frequency modulation, on the optical signal on the transmitter side; and
deriving at least one reference signal, on the receiver side, from the amplitude modulation contained in a detected signal obtained from the optical signal on the receiver side.

7. A method for dispersion detection as claimed in claim 6, the method further comprising the steps of:
emitting a phase comparison signal by a digital receiver on the receiver side;
forming the group transit time reference on the receiver side by a clock pulse emitted by an oscillator; and
regulating the oscillator and a frequency of the clock pulse in a phase control loop by a clock pulse regulator controlled by the phase comparison signal.

8. A method for dispersion detection as claimed in claim 6, wherein the frequency modulation and the amplitude modulation are impressed on the optical signal in a laser on the transmitter side.

9. A method for dispersion detection as claimed in claim 6 the method further comprising the steps of:
impressing a temporal reference, having a temporal relationship with the frequency modulation, on the optical signal by a data modulation signal on the transmitter side; and
deriving at least one reference signal, on the receiver side, from the temporal reference contained on the receiver side in a data signal corresponding to the transmitter-side data modulation signal.

10. A method for dispersion detection as claimed in claim 9, wherein the temporal reference is impressed as a frame clock of the transmitter-side data modulation signal.

* * * * *